United States Patent

[11] 3,627,029

| [72] | Inventors | Donald Vernon Osborne<br>Norwich;<br>Michael Francis Whelan, Peterborough,<br>both of England |
|---|---|---|
| [21] | Appl. No. | 815,287 |
| [22] | Filed | Apr. 11, 1969 |
| [45] | Patented | Dec. 14, 1971 |
| [73] | Assignee | National Research Development Corporation<br>London, England |
| [32] | Priority | Apr. 16, 1968 |
| [33] | | Great Britain |
| [31] | | 17,841/68 |

[54] METHOD AND APPARATUS FOR LOW-TEMPERATURE HEAT EXCHANGE
10 Claims, 1 Drawing Fig.

[52] U.S. Cl. .................................................. 165/1,
165/104, 165/133
[51] Int. Cl. ...................................................... F28f 13/18

[50] Field of Search .............................................. 165/133,
186, 1, 104; 62/45; 138/145, 146

[56]                  References Cited
            UNITED STATES PATENTS

| 2,914,169 | 11/1959 | Moore .................. | 62/45 |
| 3,407,615 | 10/1968 | Klipping .................. | 62/45 |
| 3,433,294 | 3/1969 | Timson .................. | 165/133 X |

*Primary Examiner*—Meyer Perlin
*Assistant Examiner*—P. D. Ferguson
*Attorney*—Cushman, Darby & Cushman

ABSTRACT: A method of exchanging heat between a solid and a fluid at very low temperatures comprising disposing at the interface thereof a film of material and exchanging heat through the film, the film material being chosen so that the value of the acoustic impedance as herein defined of the film is related to the acoustic impedances of the solid and the fluid, whereby the quantity $Kr$ as herein defined is reduced relative to its value if no film were disposed at the interface.

Patented Dec. 14, 1971
3,627,029
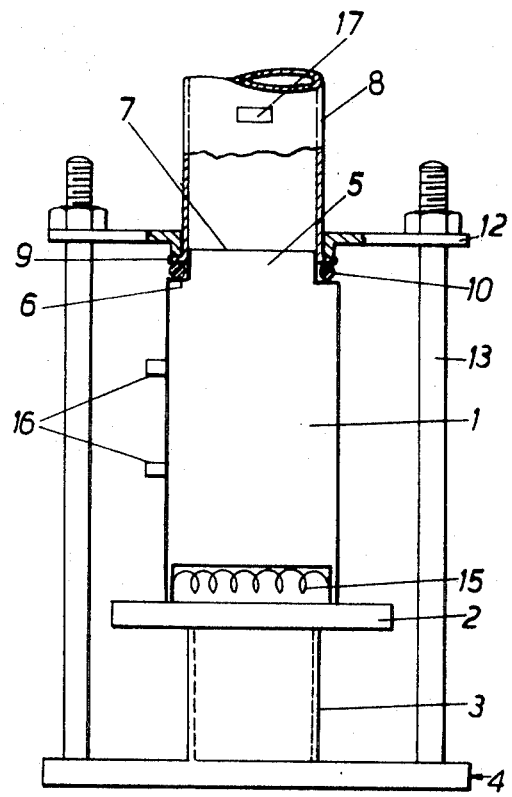
Donald Vernon Osborne
Michael Francis Whelan
Inventors
By
Cushman, Darby & Cushman
Attorneys

METHOD AND APPARATUS FOR LOW-TEMPERATURE HEAT EXCHANGE

This invention relates to a method and apparatus for heat exchange at very low temperatures. By very low temperatures we mean temperatures of the order normally associated with cryogenic fluids such as for example liquid hydrogen or liquid helium.

The transmission of heat at such very low temperatures between two materials takes place primarily through the motion of the constituent molecules. In the case of solids and, to some extent, liquids, this activity can be expressed in terms of lattice vibrations (phonons) while with gases the behavior of individual molecules has to be considered. For thermal transmission between media to be efficient there must be a ready energy transfer across the interface between phonons and/or individual molecules. A phonon is a quantized progressive wave in an acoustic mode of thermal vibration of a crystal lattice. The energy of a phonon is $h\nu$ where $h$ is Planck's constant and $\nu$ is the vibrational frequency of the phonon.

It is known that when heat is transmitted at very low temperatures between a solid and a fluid, a temperature difference occurs across the solid-fluid interface. This was first observed for the case of a copper-liquid helium II interface by Kapitza. He found that this temperature difference is directly proportional to the rate of heat transmission between the two materials and for a given rate is inversely proportional to $T^3$ where T is measured in degrees Kelvin. A convenient measure of the surface resistance to heat flow is the quantity $Kr$, which as used in this specification is defined as $Kr=\Delta T/W$ where $\Delta T$ is the temperature difference across an interface and $W$ is the heat flow rate per unit area through an interface. This quantity, when used in relation to a solid-liquid helium II interface, is generally known as the "Kapitza" resistance.

It is also known that heat transmission at very low temperatures takes place primarily through the medium of phonons. Since long wave phonons approximate to quantized sound waves, the reflection and transmission of phonons at an interface may be discussed in terms of the properties of the appropriate sound waves.

It has been found that the power transmission coefficient for sound waves travelling across a fluid/solid interface is very small when the two media have markedly different acoustic impedances. This occurs for example in the case of metals and liquid helium. The expressions power transmission coefficient and acoustic impedance will be defined hereafter.

We have found that an improvement in heat transmission at very low temperatures takes place when a thin film of suitable material is interposed between the fluid and solid. The acoustic impedance of the film must be such as to improve the acoustic matching of the solid and the fluid.

The invention therefore provides in one aspect a method of nonboiling heat exchange between a solid and a fluid at very low temperatures comprising disposing at the interface thereof a thin film of material and exchanging heat through the film, the film material being chosen so that the value of the acoustic impedance as herein defined of the film is intermediate the values of the acoustic impedances of the solid and the fluid, the film reducing the quantity $Kr$ as herein defined relative to its value if no film were disposed at the interface.

In another aspect, the invention provides apparatus when used for nonboiling heat exchange at very low temperatures comprising a solid and a fluid having an interface, the solid and fluid exchanging heat, a thin film of material being disposed at the interface, heat being exchanged through said film the film material being chosen so that the value of the acoustic impedance as herein defined of the film is intermediate the values of the acoustic impedances of the solid and the fluid, the film reducing the quantity $Kr$ as herein defined relative to its value if no film were disposed at the interface.

The term "acoustic impedance" $R$ of a medium as used herein is defined by $$R=\rho c$$

where $\rho$ is the density of the medium and $c$ is the velocity of sound therein.

Preferably the acoustic impedance of the film is intermediate in value between the acoustic impedances of the solid and the fluid.

Preferably the acoustic impedance $R_2$ of the film is approximately within the range $$\tfrac{1}{4}|\sqrt{R_1 R_3}| \leq R_2 \leq 4|\sqrt{R_1 R_3}|$$

where $R_1$ and $R_3$ are the acoustic impedances of the solid and the fluid respectively.

Preferably the acoustic impedance of the film is approximately equal to $|\sqrt{R_1 R_3}|$.

The thickness of the film may be approximately $n\lambda/4$ where $\lambda$ is the wavelength in the film of the phonons passing therethrough and having maximum energy at the temperature of the film during heat exchange and $n$ is a positive odd integer, $n$ being chosen so that the film thickness is not so great as to cancel the reduction in the quantity $Kr$ occasioned by the choice of film material.

The film may be a multilayer film. The film or each layer thereof may respectively be composed of barium stearate of polyethylene or polystyrene.

The fluid may be liquid helium at a temperature below the $\lambda$-point of liquid helium.

The invention is explained by, but is not restricted to, the following discussion, and is described merely by way of example with reference to the accompanying drawing which shows apparatus used in the invention.

Consider two media of densities $\rho_1$ and $\rho_3$ respectively. The acoustic impedances of the two media are given by $$R_1 = \rho_1 c_1$$
$$\text{and } R_3 = \rho_3 c_3$$

where $c_1$ and $c_3$ are the velocities of sound in the two media. The sound power transmission coefficient for a sound wave incident normally on the interface between these two media is defined by $$\alpha_t = \frac{4 R_1 R_3}{(R_1+R_3)^2} \quad (A)$$

If $R_1 \gg R_3$ then $\alpha_t$ is small. The acoustic impedance for liquid helium is approximately $0.03 \times 10^6$ kg. m.$^{-2}$ sec.$^{-1}$ and for metals is $40$–$50 \times 10^6$ kg. m.$^{-2}$ sec.$^{-1}$. Hence for a liquid helium-metal interface $\alpha_t$ is approximately 0.003.

If, however, the media are separated by a film of thickness $h$ and acoustic impedance $R_2$, the sound power transmission coefficient is defined by $$\alpha_t = \frac{4 R_3 R_1}{(R_1+R_3)^2 \cos^2 kh + \left(R_2 + \frac{R_3 R_1}{R_2}\right)^2 \sin^2 kh} \quad (B)$$

where $k=2\pi/\lambda$, and $\lambda$ is the wavelength of acoustic waves in the film of a frequency equal to the vibrational frequency $\nu$ of the phonon. The definition A above is of course only a special case of definition B where $h=0$, that is to say when no film is present. $\alpha_t$ reaches its maximum value (unity) when both $R_2 = \sqrt{R_1 R_3}$ and $h=\lambda/4, 3\lambda/4, 5\lambda/4$ etc.

The frequency of the phonons carrying maximum energy is a function of temperature ($\nu_{max}$ at $1.0°$ K. $\approx 6 \times 10^{10}$ c./s., at $2.0°$ K. $\nu_{max} \approx 12 \times 10^{10}$ c./s.). This means that $\lambda$ is also temperature dependent and therefore the optimum film thickness will depend on the temperature range over which an improvement in transmission is required.

Table I shows the calculated power transmission coefficients for the low-temperature energy spectrum of phonons incident normally on a solid/film/liquid arrangement. The assumed acoustic impedances of the solid and liquid are in the ratio of 1000:1 and the impedance of the film is given by $R_{film} = \sqrt{R_{solid} \times R_{liquid}}$. $\lambda$ is the wavelength of sound waves equivalent to the phonons with maximum energy.

TABLE I

| Film thickness ($h$) | Sound transmission coefficient |
| --- | --- |

| | |
|---|---|
| No film | 0.004 |
| $\lambda/8$ | 0.063 |
| $\lambda/4$ | 0.082 |
| $\lambda/2$ | 0.076 |
| $3\lambda/2$ | 0.063 |
| $3\lambda$ | 0.063 |
| $6\lambda$ | 0.063 |

Thus some increase in the transmission of heat is expected for any film thickness up to at least $6\lambda$ with the transmission coefficient having a maximum value when $h=\lambda/4$. It will be appreciated that some of the values of $h$ in table 1 ostensibly give $a_t=4R_3R_1$, (i.e., the same as when $h=0$). However, it is emphasized that table 1 relates to a spectrum of phonons of distributed energies, frequencies and wavelengths, and that $\lambda$ in table 1 is the wavelength of the phonons of maximum energy only. Although some improvement in heat transmission may be expected theoretically whatever the film thickness (providing the acoustic impedance value is suitable) with maxima occuring at $n\lambda/4$ where $\lambda$ is as defined and $n$ is any odd positive integer, from a practical point of view, too thick a film will produce an additional impedance to the flow of heat, thereby reducing the initial improvement in heat transmission.

A departure from strict equality of $R_2^2$ and $R_1 \times R_3$ by a factor of 2 in $R_2^2$ causes a reduction in the sound transmission coefficient from 0.063 to 0.0417 (for $h=6\lambda$). The latter value is still an order of magnitude greater than that expected with no film.

We consider that an improvement in heat transmission still may be expected when the value of the acoustic impedance of the interposed film differs from the optimum value by a factor of 4 or more.

It is also known that when metals become superconducting a certain fraction of their electrons go into the "superconducting" state and no longer assist in heat transport. The phonon mode of heat transmission therefore plays an increasingly important role at whatever temperature the material becomes superconducting.

When the fluid is a gas, then a reduction in the value of $Kr$ is obtained but if the mean free path of the molecules of the gas is short compared to the dimensions of the container in which the gas is enclosed then the thermal conductivity of gas, rather than the value of the quantity $Kr$ becomes the dominant factor controlling the rate of heat exchange, and the improvement due to the reduction in the value of $Kr$ may not be so noticeable. The mean free path of the molecules is of course a function of the pressure of the gas, being long when the gas is at very low pressure.

Nonlimitative examples of suitable materials for use as the film are barium stearate, polyethylene ($R \approx 1.75 \times 10^6$ Kg.m.$^{-2}$ sec.$^{-1}$) and polystyrene ($R \approx 2.48 \times 10^6$ kg. m.$^{-2}$sec.$^{-1}$).

A film of material comprising a plurality of layers of the same or different composition to provide the desired acoustic impedance also appears possible.

The film may be deposited on the solid by any suitable means including vacuum deposition, or deposition from solution, or low-energy electron bombardment of a surface which is simultaneously exposed to a polymerizable gas such as ethylene. Polyethylene film may also be produced by evaporation from a stainless steel boat through a heated sieve lid.

The invention may be used, for example, to increase heat exchange in superconducting magnets, power transformers and power transmission lines. It may also be used to improve the exchange of heat between a gas at very low pressure and the walls of heat exchanger.

The apparatus shown in the drawing was designed to measure the surface resistance to heat flow (the quantity $Kr$) for a specimen of gold. The quantity $K_r$ being hereinbefore defined as $K_r=\Delta T/W$ where $\Delta T$ is the temperature difference across the interface ans $W$ is the that flow rate per unit area through the interface and $W$ is the heat flow rate per unit area through the interface, is thus analogous to the reciprocal of the conventional heat transfer coefficient used in calculations of heat transfer at normal temperatures.

The apparatus comprises a specimen, made of gold and shaped in the form of a cylindrical bar, 7 mm. in diameter and 10 mm. long, mounted on a Perspex (Registered Trade Mark) disc 2 which is supported by a stainless steel tube. The tubing and disc are arranged to support the specimen from a mounting 4 whilst thermally insulating it therefrom.

The upper end of the specimen has a reduced diameter portion 5, forming a circumferential shoulder 6. The portion 5 has an end surface 7 normal to the axis of the specimen. A further stainless steel tube 8 extends over the reduced diameter portion 5. The internal diameter of the tube 8 is such that the portion 5 is a close fit therein. The tube 8 has at its lower end a radially extending flange 9. Between the flange 9 and the shoulder 6 is disposed an O-ring 10 which forms a fluidtight seal therebetween. The tube 8 is held against the O-ring 10 by an apertured disc 12 which bears against the upper face of the flange 9. The tube 8 is thermally insulated from the disc 12 which is held thereagainst by tie bolts 13.

The base of the specimen 1 is recessed to receive an electrical heating coil 15. The coil 15 is electrically insulated from the specimen 1, but is held in contact therewith by the Perspex disc 2. A pair of carbon resistance thermometers 16 are attached to the specimen 1 a known distance apart. A further carbon resistance thermometer 17 is disposed in the interior of the tube 8.

In operation, the apparatus is disposed in a vacuum at a maximum pressure of $10^{-5}$ mm. Hg and liquid helium at a temperature below the $\lambda$-point thereof is introduced into the tube 8 and into contact with the end surface 7. At temperatures below the $\lambda$-point (just below 2.2° K.) liquid helium becomes superfluid, and its thermal conductivity is markedly increased.

Heat is supplied to the specimen 1 and flows axially along the specimen and through the surface 7 into the liquid helium. The temperature difference between the thermometers 16 indicates the heat flow rate, and the thermometer 17 measures the temperature of the liquid helium.

The apparatus was initially operated with the surface 7 of the gold specimen 1 clean and uncoated and the quantity $Kr$ was measured. Then thin films of barium stearate were deposited on the surface in various thicknesses. From the uncoated surface, and for each new film, values for the quantity $Kr$ were obtained over the temperature range 1°–2° K. The following is a sample of the results recorded, using liquid helium.

| At T=1.6° K. | Film Thickness (A.) | Quantity $Kr$ (deg. cm.$^2$ Watt$^{-1}$) |
|---|---|---|
| | no film | 3.5 |
| | 75 | 2.4 |
| | 175 | 2.0 |

The barium stearate films were deposited using the following technique.

A Perspex bath (20×60×10 cm.) was filled with a 1×10$^{-4}$M solution of barium acetate in double-distilled water. A small quantity of 0.5 percent solution of stearic acid in n-hexane was then spread on the surface of the barium solution in a suitable container. The n-hexane was allowed to evaporate and the stearic acid combined with the barium acetate to form a surface monolayer of barium stearate. The surface monolayer was then compressed by moving a plastic boom across the surface to compress the monolayer against the walls of the container. When the monolayer had been compressed to an extent that the force it exerted "the surface pressure" on the boom was 30 dyne/cm. length then the monolayer was transferred to the gold surface as a monolayer by drawing the gold specimen 1 through the surface of the bath. Further layers were transferred by repeated dippings of the specimen 1 into the bath.

We claim:

1. A method of nonboiling heat exchange between a solid and a fluid at very low temperatures normally associated with cryogenic fluids including liquid hydrogen and liquid helium comprising disposing at the interface thereof a thin film of material and exchanging heat through the film, the film material being chosen so that the value of the acoustic impedance as herein defined of the film is intermediate the values of the acoustic impedances of the solid and the fluid, the film reducing the quantity $Kr$ as herein defined relative to its value if no film were disposed at the interface.

2. A method as claimed in claim 1 wherein the acoustic impedance $R_2$ of the film is approximately within the range $$\frac{1}{4}\left|\sqrt{R_1 R_3}\right| \leq R_2 \leq 4\left|\sqrt{R_1 R_3}\right|$$

where $R_1$ and $R_3$ are the acoustic impedances of the solid and the fluid respectively.

3. A method as claimed in claim 2 wherein the acoustic impedance of the film is approximately equal to $\left|\sqrt{R_1 R_3}\right|$.

A method as claimed in claim 3 wherein the fluid is liquid helium, at a temperature below the $\lambda$-point of liquid helium.

5. A method as claimed in claim 1 wherein the thickness of the film is approximately $n\lambda/4$ where $\lambda$ is the wavelength in the film of phonons passing therethrough and having maximum energy at the energy at the temperature of the film during heat exchange, $n$ being a positive odd integer, chosen so that the film thickness is not so great as to cancel the reduction in the quantity $Kr$ occasioned by the choice of film material.

6. A method of nonboiling heat between a solid and liquid helium at a temperature below the $\lambda$-point thereof, comprising disposing at the interface of the solid and the helium a thin film of material and exchanging heat through the film, the film material being chosen so that the value of the acoustic impedance of the film is intermediate the values of the acoustic impedances of the solid and the helium, the film reducing the quantity $Kr$ as herein defined relative to its value if no film were present at the interface.

7. Apparatus when used for nonboiling heat exchange at very low temperatures normally associated with cryogenic fluids including liquid hydrogen and liquid helium comprising a solid and a fluid having an interface, the solid and fluid exchanging heat, a thin film of material being disposed at the interface, heat being exchanged through said film, the film material being chosen so that the value of the acoustic impedance as herein defined of the film is intermediate the values of the acoustic impedances of the solid and the fluid, the film reducing the quantity $Kr$ as herein defined relative to its value if no film were disposed at the interface.

8. Apparatus as claimed in claim 7 wherein the film is a multilayer film, the acoustic impedance of the layers providing the film as a whole with an effective acoustic impedance of a value intermediate the values of the acoustic impedances of the solid and the fluid.

9. Apparatus as claimed in claim 8 wherein the material of each layer of the film is chosen from the group consisting of barium stearate, polyethylene and polystyrene.

10. Apparatus as claimed in claim 7 wherein the film material is chosen from the group consisting of barium stearate, polyethylene and polystyrene.

* * * * *